United States Patent
Lange et al.

(10) Patent No.: US 6,741,364 B2
(45) Date of Patent: May 25, 2004

(54) APPARATUS FOR DETERMINING RELATIVE POSITIONING OF OBJECTS AND RELATED METHODS

(75) Inventors: Michael Ray Lange, Melbourne, FL (US); Robert M. Montgomery, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 5 days.

(21) Appl. No.: 10/217,945

(22) Filed: Aug. 13, 2002

(65) Prior Publication Data

US 2004/0032596 A1 Feb. 19, 2004

(51) Int. Cl.[7] .............................................. G01B 11/24
(52) U.S. Cl. ................... 356/622; 356/623; 356/139.03
(58) Field of Search ........................ 356/139.03, 139.05, 356/139.06, 614, 620, 622–623, 625, 634–635; 250/559.29, 237 G; 700/59

(56) References Cited

U.S. PATENT DOCUMENTS

| | | | |
|---|---|---|---|
| 3,491,969 A | 1/1970 | Muldoon et al. ............... 244/1 |
| 5,122,660 A | * 6/1992 | Yoshii et al. ........... 250/237 G |
| 5,153,419 A | 10/1992 | Takahashi ................. 250/201.1 |
| 5,463,463 A | * 10/1995 | Harvey et al. .............. 356/623 |
| 5,552,883 A | * 9/1996 | Busch-Vishniac et al. ............................................ 356/139.03 |
| 5,698,861 A | * 12/1997 | Oh ......................... 250/559.29 |
| 5,793,483 A | * 8/1998 | Zehnpfennig et al. . 356/139.03 |
| 5,883,803 A | * 3/1999 | Vann ........................... 700/59 |
| 5,894,370 A | 4/1999 | Okuda et al. ................ 359/822 |
| 5,912,738 A | 6/1999 | Chason et al. .............. 356/371 |
| 5,920,395 A | * 7/1999 | Schulz ........................ 356/622 |
| 5,933,240 A | * 8/1999 | Jurca .......................... 356/623 |
| 5,943,133 A | 8/1999 | Zeylikovich et al. ........ 356/354 |
| 5,974,365 A | 10/1999 | Mitchell ..................... 702/150 |
| 6,115,111 A | 9/2000 | Korah et al. ............... 356/4.01 |
| 6,404,506 B1 | * 6/2002 | Cheng et al. ............... 356/634 |

\* cited by examiner

*Primary Examiner*—Frank G. Font
*Assistant Examiner*—Sang H. Nguyen
(74) *Attorney, Agent, or Firm*—Allen, Dyer, Doppelt, Milbrath & Gilchrist, P.A.

(57) ABSTRACT

An apparatus for determining relative positioning of first and second objects being relatively movable may include a laser source carried by the first object for generating a source laser beam toward the second object, and a target optical element carried by the second object for generating a first reflected beam and a second diverging reflected beam from the source laser beam. Furthermore, a detector may be carried by the first object for detecting the first reflected beam and the second diverging reflected beam. A controller may also be connected to the detector for determining a range between the detector and target optical element based upon a size of the second diverging reflected beam. The controller may also determine at least one other positional degree of freedom quantity (e.g., lateral/vertical displacement, pitch angle, yaw angle, and/or roll angle) based upon the first reflected beam and the second diverging reflected beam.

41 Claims, 4 Drawing Sheets

APPARATUS FOR DETERMINING RELATIVE POSITIONING OF OBJECTS AND RELATED METHODS

FIELD OF THE INVENTION

The present invention relates to the field of measurement systems, and, more particularly, to optical position determining systems and related methods.

BACKGROUND OF THE INVENTION

There are many applications in which it is important to know the relative position of one object with respect to another. For example, in automated manufacturing processes using robots, the position of the robot must be accurately controlled to ensure that the position on a work piece at which a fastener is being placed, a weld is being made, etc., is correct.

To obtain precise accuracy in applications where most, if not all, six degrees of freedom (i.e., elevation (or vertical position), azimuth (or lateral position), range (or distance), pitch, yaw, and roll) must be accounted for, computer numerical control (CNC) systems may be used with machine vision and/or optical devices. While such systems may be capable of providing very accurate positional measurements, they are generally relatively large, complex, and costly to implement. As such, these systems may not be practical in some applications where space or cost constraints are tight.

Other less complicated sensors may be used in some applications to measure multiple degrees of positional freedom between objects. For example, inductive or capacitive sensors may be used to determine whether two objects are displaced from one another laterally, vertically, and/or in distance (i.e., range). Yet, these sensors typically require a very close proximity between the two objects. Moreover, they do not provide other positional degree of freedom information such as pitch, yaw, and roll.

Another example of a position determining system may be found in U.S. Pat. No. 5,974,365 to Mitchell. This patent discloses a system for position measurement and alignment of one object relative to another, particularly the alignment of two spacecraft for docking. To this end, the system includes a linear optical detector array sensor on the first object and a predetermined target pattern (i.e., a series of right-side up and upside down "V"s) on the second object. Based upon the image formed by the target pattern on the detector, the six degrees of freedom of the second object are calculated by a microprocessor using certain algorithms. Another somewhat related system for use in docking spacecrafts is disclosed in U.S. Pat. No. 3,491,969 to Muldoon.

Other position measuring systems may be appropriate where not all six degrees of freedom of an object need be measured. For example, U.S. Pat. No. 5,984,370 to Okuda et al. is directed to an inclination monitoring system for adjusting the inclination of an objective lens during the manufacture of an optical disk drive. To monitor the inclination the objective lens, the system includes a light emitting unit, a beam splitter, a converging lens, a charge-coupled device (CCD), and a data processing device and display therefor. The light emitting device is driven to emit a light beam which has a slightly larger diameter in cross section than a diameter of the objective lens. The light beam reflects off the beam splitter toward the objective lens. A flat portion of the objective lens reflects a part of the beam which passes through the beam splitter and is focused by the converging lens on the CCD. The CCD outputs an image signal to the data processing device, which causes an image of the reflected beam focused on the CCD to be displayed on the display. An operator may thus adjust the angle of inclination (i.e., pitch and yaw) of the objective lens until the image is centered at the correct location on the display.

Unfortunately, there are other positioning or alignment applications which would benefit from greater accuracy, and while being relatively straightforward to implement.

SUMMARY OF THE INVENTION

In view of the foregoing background, it is therefore an object of the present invention to provide an apparatus and related methods for determining relative positioning of objects in multiple degrees of freedom which are relatively cost effective and may be implemented in applications where space is limited.

These and other objects, features, and advantages in accordance with the present invention are provided by an apparatus for determining relative positioning of first and second objects being relatively movable using a laser source and a target optical element. The apparatus may include the laser source carried by the first object for generating a source laser beam toward the second object, and the target optical element may be carried by the second object for generating a first reflected beam and a second diverging reflected beam from the source laser beam. Furthermore, a detector may be carried by the first object for detecting the first reflected beam and the second diverging reflected beam. A controller may also be connected to the detector for determining a range between the detector and target optical element based upon a size of the second diverging reflected beam. In some embodiments, the controller may also determine at least one other positional degree of freedom quantity based upon the first reflected beam and the second diverging reflected beam.

Accordingly, the controller may determine at least one of alignment error data and second object position data based upon the determined range and/or the determined at least one other positional degree of freedom quantity. Such data may then advantageously be used for correcting the relative positioning between the first and second objects, if necessary, or for updating motor drive position encoding tables, for example.

In particular, the controller may determine the at least one other positional degree of freedom quantity by calculating a first centroid for the first reflected beam and a second centroid for the second diverging reflected beam, and determining positions of the first and second centroids. Additionally, the controller may define vertical and lateral reference coordinates, and the at least one other positional degree of freedom quantity may be at least one of vertical displacement, lateral displacement, pitch angle, and yaw angle.

The controller may further define a first roll angle reference pattern, and the target optical element may have a pattern generator associated therewith for imparting a second roll angle reference pattern to one of the first reflected beam and second diverging reflected beam. As such, the at least one other positional degree of freedom quantity may be a roll angle determined based upon the first and second roll angle reference patterns. Particularly, in some advantageous embodiments the pattern generator may be a diffractive optical element (DOE) associated with a front or rear surface of the target optical element. Similarly, the second diverging beam may include a plurality of diffracted rays.

By way of example, the target optical element may include a lens having a flat rear surface and a convex front surface. Moreover, a partially reflective coating may be on the front surface of the lens and a more reflective coating may be on the rear surface. The target optical element may also include a corner cube.

In addition, the laser source may include a laser emitter and a beam splitter downstream therefrom, and the detector may include an array of pixel elements. A reference indicator may also be carried by the first object for aligning the laser source, and the controller may control the laser source to provide a desired signal level at the detector. Further, an optical filter may also be associated with the detector.

A method aspect of the invention is for determining relative positioning of relatively movable first and second objects. The method may include generating a source laser beam toward the second object, and generating a first reflected beam and a second diverging reflected beam from the source laser beam using a target optical element carried by the second object. The method may further include detecting the first reflected beam and the second diverging reflected beam using a detector carried by the first object. Accordingly, a range between the detector and target optical element may be determined based upon a size of the second diverging reflected beam. Furthermore, at least one other positional degree of freedom quantity may also be determined based upon the first reflected beam and the second diverging reflected beam.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1–4, an apparatus 20 is now described for determining relative positioning of first and second objects 30, 31 which are relatively movable with respect to one another in vertical (v), lateral (l), and range (r) directions. The first and second objects 30, 31 may also be relatively rotatable to define pitch, yaw, or roll angles which may be also determined by the apparatus 20.

Figure 1:
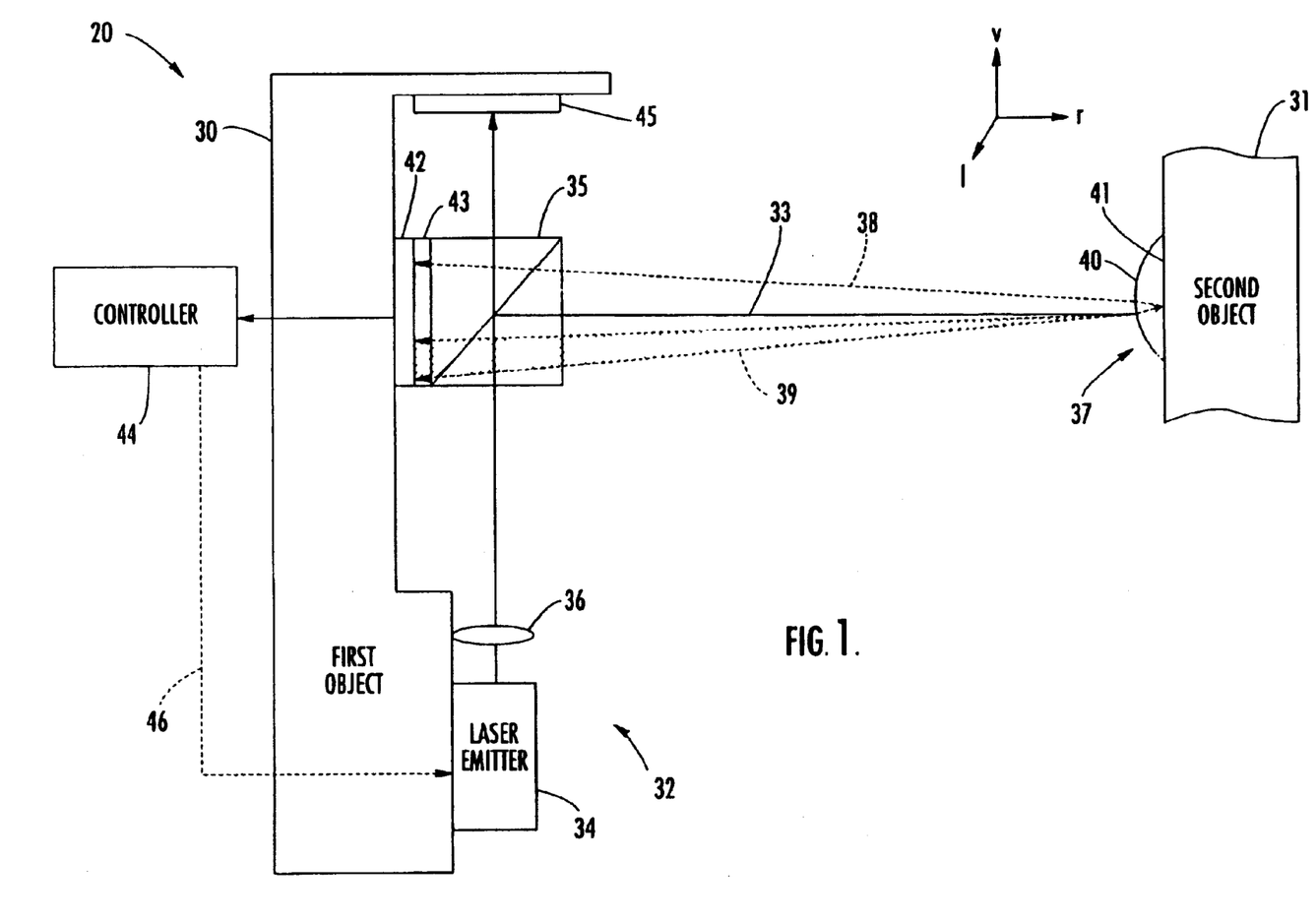
FIG. 1 is schematic block diagram of an apparatus for determining relative positioning in accordance with the present invention.

The apparatus 20 illustratively includes a laser source 32 carried by the first object 30 for generating a source laser beam 33 toward the second object 31. More particularly, the laser source 32 illustratively includes a laser emitter 34 (e.g., a laser diode) and a beam splitter 35 downstream therefrom. In some embodiments, additional focusing optics 36 (e.g., lenses) may be included upstream (or downstream) from the beam splitter 35, as will be appreciated by those of skill in the art. The apparatus 20 may also optionally include a reference indicator, such as another detector 45 or a marking, on or carried by the first object 30 (or another object) for aligning the laser source 32. This may be particularly helpful during an initial setup and/or calibration of the laser source 12, for example. In some embodiments the reference indicator may also advantageously be used for aligning the first object 30 with a platform, frame, etc., when the first object is to be carried thereby, as will be appreciated by those skilled in the art.

The illustrated apparatus 20 further includes a target optical element such as the illustrated lens 37 carried by the second object 31 for generating a first reflected beam 38 and a second diverging reflected beam 39 from the source laser beam 33. For clarity of illustration, the source laser beam 33 is illustrated as a solid line, and the first reflected beam 38 and second diverging reflected beam 39 are illustrated using dashed lines.

Figure 2:
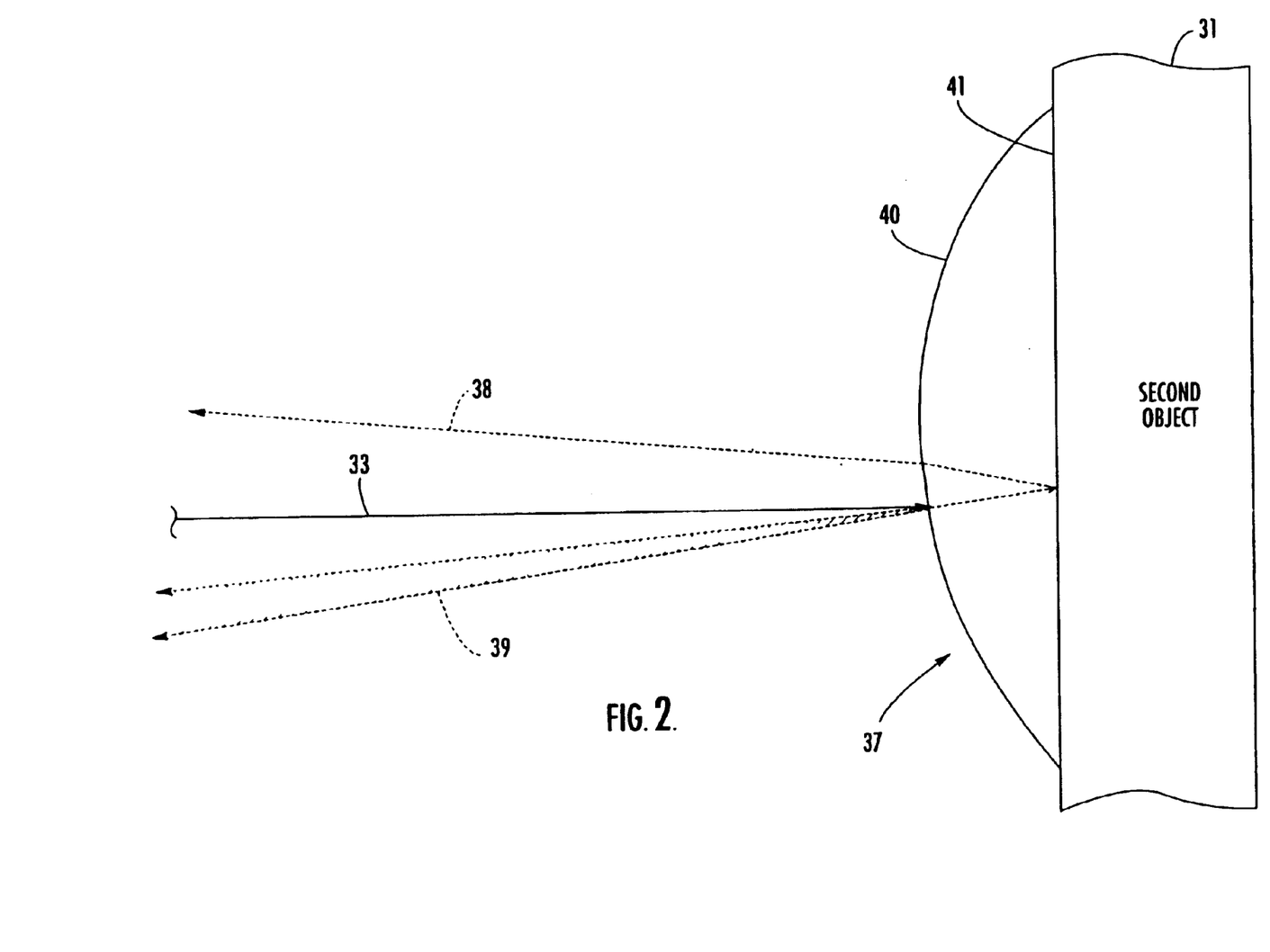
FIG. 2 is a more detailed schematic diagram of the target optical element of FIG. 1 illustrating the generation of a first reflected beam and a second diverging reflected beam from a source laser beam.

More particularly, the lens 37 has a convex front surface 40 which reflects a portion of the source laser beam 33 to generate the second diverging reflected beam 39, as may be more clearly seen in the greatly enlarged view of FIG. 2. Furthermore, the lens 37 also has a flat rear surface 41 which reflects a remaining portion of the source laser beam 33 which enters the lens, as illustratively shown. When this reflected light exits the lens 37 at the front surface 40, it converges to generate the first reflected beam 38.

To achieve such reflection of the source laser beam 33 off of the front and rear surfaces 40, 41, the front surface is preferably coated with a partially reflective coating, and the rear surface is coated with a more reflective coating. By way of example, the coating on the front surface 40 may be about 30–50% percent reflective, and the coating on the rear surface 41 may be substantially 100% reflective, although other percentages may be used depending upon the given application.

Figure 3:
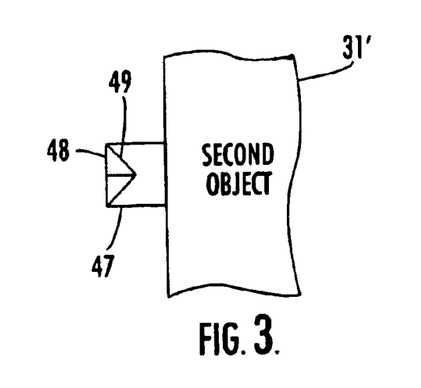
FIG. 3 is a schematic block diagram illustrating an alternate target optical element of the apparatus of FIG. 1.

In accordance with an alternate embodiment of the invention illustrated in FIG. 3, the target optical element may be a corner cube 47. While a standard corner cube typically reflects a single beam back at the source, the corner cube 47 may have a front surface 48 which partially reflects the source laser beam 33 to create the second diverging reflected beam 39, and the three internal mirrored surfaces 49 of the corner cube may generate the first reflected beam 38. The second diverging reflected beam 39 may be generated in various ways when using the corner cube 47. For example, the source beam 33 may be generated as a diverging beam using the focusing optics 36, in which case both the first and second reflected beams 38, 39 will be diverging, as will be understood by those skilled in the art. Also, a diffractive pattern or optical element could be associated with the front surface 48 or internal mirrored surfaces(s) 49 so that the first and/or second reflected beams 38, 39 includes a diverging pattern of diffracted rays, as will also be understood by those of skill in the art. Of course, other suitable target optical elements may be used in some embodiments.

In either case, the first reflected beam 38 and second diverging reflected beam 39 return back toward the first object 30 along the r axis, pass through the beam splitter 35, and hit a detector 42 carried by the first object. An optional filter 43 may also be included in some embodiments for reducing the amount ambient light from external sources that reaches the detector 42, as will be appreciated by those of skill in the art. The detector 42 may include an array of pixel elements 60 (FIG. 4) for detecting the first reflected beam 38 and the second diverging reflected beam 39. By way of example, the detector 42 may be a charge-coupled device (CCD), although other suitable detectors may also be used.

The first and second reflected beams 38, 39 form two-dimensional patterns 61, 62 (FIG. 4) on the array of pixel elements of the detector 42 which correspond to a cross-section of the beams in the V-L plane. From these patterns, a controller 44 (e.g., a computer) connected to the detector 42 can determine various positional degree of freedom quantities with respect to the second object 31, which will be discussed further below. The connection between the controller 44 and detector 42 may be either a wired or wireless connection, as will be appreciated by those of skill in the art. In some embodiments, the controller 44 may optionally control the laser source 32 to provide a desired signal level at the detector 42, as illustratively shown with the dashed control line 46 in FIG. 1.

Turning now additionally to FIGS. 5–10, the determination of various positional degree of freedom quantities between the first and second objects 30, 31 by the apparatus 20 will now be described. For purposes of the foregoing discussion, reference numerals in FIGS. 4–10 differing by decades are used to indicate similar elements in the different examples illustrated therein. For example, the arrays of pixel elements 60, 70, 80, etc. are all similar elements, and so on. As such, certain of these elements may only be noted upon their first occurrence to avoid undue repetition, but later occurring elements are understood to be similar to those first described.

In some embodiments the controller 44 may advantageously determine displacement in all six degrees of freedom between the first and second objects 30, 31 based upon the first and second beam patterns 61, 62 formed on the array of pixel elements 60 by the first reflected beam 38 and second diverging reflected beam 39, respectively. These six degrees of freedom include range (distance), vertical displacement (elevation), lateral displacement (azimuth), pitch angle, yaw angle, and roll angle.

Figure 4:
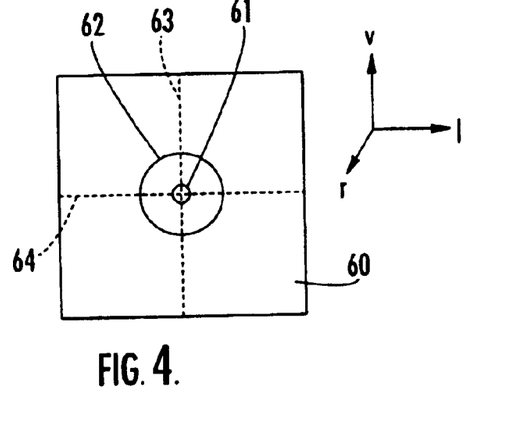
FIG. 4 is a schematic diagram illustrating a two-dimensional pattern of the first reflected beam and the second diverging reflected beam on the detector of FIG. 1 when the first and second objects are in positional alignment.

Before describing how a change or deviation in any one of these degrees of freedom is determined, reference will first be made to the case where the first and second objects 30, 31, and thus the detector 42 and target optical element, are positionally aligned in all six degrees of freedom, which is illustrated in FIG. 4. For ease of reference, dashed vertical and lateral reference axis lines 63, 64 are provided to illustrate the center of the array of pixel elements 60, as will be understood with reference to the figure legend. However, it should be noted that while the controller 44 defines vertical and lateral reference coordinates for use in determining positional degree of freedom quantities, the reference axis lines 63, 64 are provided for illustrational purposes only and would not typically be physically defined on the array of pixels 60 (although references could be included on the array in some embodiments).

As shown in FIG. 4, when the first and second objects 30, 31 are in alignment, the first and second beam patterns are centered at the intersection of the vertical and lateral reference lines 63, 64. That is, the source laser beam 33 hits the center of the lens 37, and the first reflected beam 38 and second diverging reflected beam 39 are directed straight back at the center of the detector 42, as will be appreciated by those of skill in the art.

Figure 5:
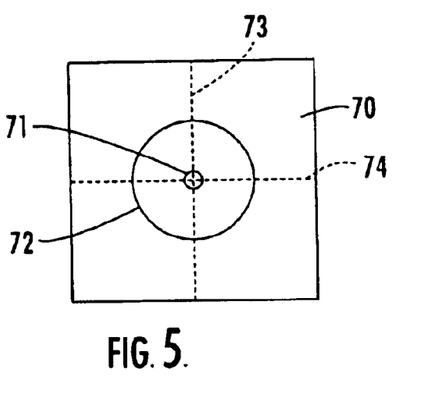
FIG. 5 is a schematic diagram illustrating a two-dimensional pattern of the first reflected beam and the second diverging reflected beam on the detector of FIG. 1 when the second object is displaced a certain range or distance from the first object.

Referring now to FIG. 5, to determine the range between the detector 42 and target optical element, the controller 44 determines a size of the second diverging reflected beam 39 from its beam pattern 72. That is, the farther the second object 31 is away from the first object 30, the larger the second beam pattern 72 will be because the second diverging reflected beam diverges over a greater distance, and vice versa. Accordingly, the controller 44 can determine the absolute range from the first object 30 to the second object 31 by determining the size of the second beam pattern based upon knowing the divergence angle produced by the lens 37. The controller 44 could also determine that the first and second objects 30, 31 were at a predetermined alignment range, for example, by comparing the detected size of the beam pattern 72 with a reference pattern, as will be appreciated by those of skill in the art.

Figure 6:
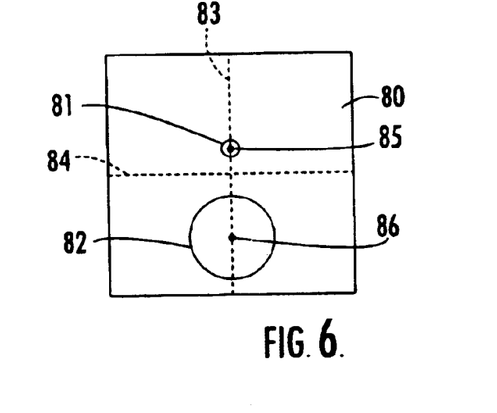
FIG. 6 is a schematic diagram illustrating a two-dimensional pattern of the first reflected beam and the second diverging reflected beam on the detector of FIG. 1 when the second object is vertically (i.e., elevationally) displaced from the first object.
Figure 7:
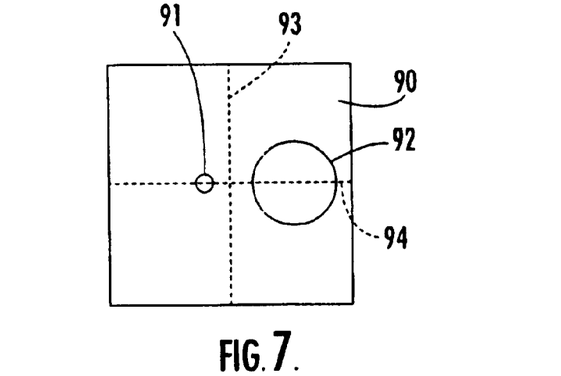
FIG. 7 is a schematic diagram illustrating a two-dimensional pattern of the first reflected beam and the second diverging reflected beam on the detector of FIG. 1 when the second object is laterally (i.e., azimuthally) displaced from the first object.
Figure 8:
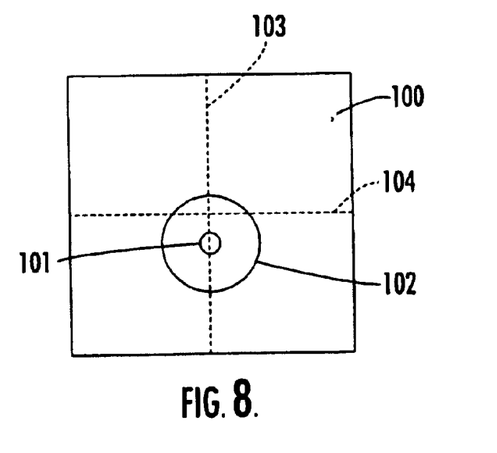
FIG. 8 is a schematic diagram illustrating a two-dimensional pattern of the first reflected beam and the second diverging reflected beam on the detector of FIG. 1 when the second object is displaced at a certain pitch angle from the first object.
Figure 9:
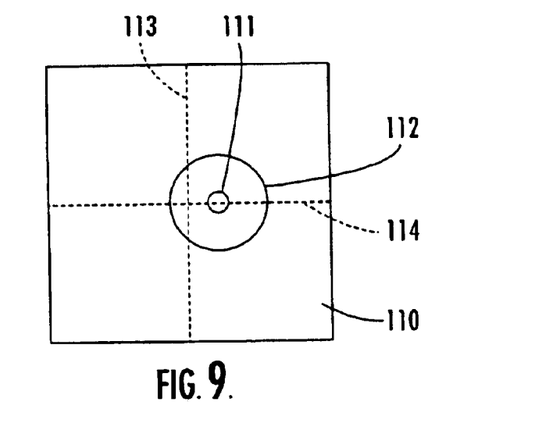
FIG. 9 is a schematic diagram illustrating a two-dimensional pattern of the first reflected beam and the second diverging reflected beam on the detector of FIG. 1 when the second object is displaced at a certain yaw angle from the first object.

The controller 44 may also advantageously determine positional degree of freedom quantities for vertical displacement, lateral displacement, pitch angle, and/or roll angle based upon the first and second beam patterns 81, 82 of the first reflected beam 38 and the second diverging reflected beam 39. More particularly, the controller 44 calculates a first centroid 85 for the first reflected beam 38 and a second centroid 86 for the second diverging reflected beam 39, as illustrated in FIG. 6. It should be noted that while the first and second centroids 85, 86 are illustratively shown superimposed on the array of pixel elements 80 in FIG. 6 for reference purposes, these centroids would in actuality not physically be on the array. Rather, they are numerical coordinates determined by the controller 44.

Accordingly, based upon the location of the first and second centroids 85, 86, the controller 44 determines in which positional degree(s) of freedom the second object 31 is displaced from the first object 30. For example, if the centroid 85 is above the lateral reference line 84 and the centroid 86 is below the lateral reference line (FIG. 6), then this means that the second object 31 is vertically higher than the first object 30, as is the illustrated case in FIGS. 1 and 2. Thus, by using look up tables with known positional offsets or relatively straightforward geometric formulas, the amount of the vertical displacement may be determined by the controller 44, as will be appreciated by those of skill in the art.

Lateral displacement of the second object 31 with respect to the first object 30 may similarly be determined. That is, when centroids (not shown) of the first and second beam patterns 91, 92 are on opposite sides of the vertical reference line 93 (assuming no other positional degree of freedom displacement) (FIG. 7), then the second object 31 is laterally displaced from the first object 30. Moreover, when both centroids are above/below the lateral reference line 104, the second object 31 is at a certain pitch angle with respect to the first object 30 (FIG. 8), and when both centroids are on one side of the vertical reference line 113 (FIG. 9), the second object is at a certain yaw angle with respect to the first object.

Again, by using coordinates from a lookup table or known geometrical relationships, each of the above positional degree of freedom quantities can be determined by the controller 44. Thus, for example, the controller 44 may be a computer with a memory and processor for performing these computational functions. Additionally, the controller 44 may also determine alignment error data and/or second object 31 position data, depending upon the particular application, based upon one or more of the determined range, lateral displacement, vertical displacement, pitch angle, yaw angle, and roll angle (discussed below).

This data may then be fed back to a positional controller for the second object 31 (e.g., a robotic arm controller) so that the appropriate position correction between the first and second objects 30 and 31 may be made of course, in some applications such as docking of spacecraft, for example, the alignment error/position data may be used to reposition the first object 30 (e.g., a spacecraft) approaching an orbiting second object 31 (e.g., a satellite). Such repositioning and/or recalibration of various objects is contemplated by the present invention, but needs no further discussion herein as such will be readily appreciated by those of skill in the art.

In the above examples the various beam patterns were shown as being round for ease of illustration and understanding. Yet, those of skill in the art will appreciate that the beam patterns, particularly the second beam pattern, may be slightly out of round when first and second objects 30, 31 are offset with respect to the pitch and/or yaw angle, for example, and that other beam shapes may be used. Also, while displacements in each of the five above-noted positional degrees of freedom were illustrated separately for ease of understanding, the first and second objects 30, 31 may be positionally offset in any number of degrees of freedom (including roll angle, described below) at the same time, and the controller 44 may determine each such displacement.

Figure 10:
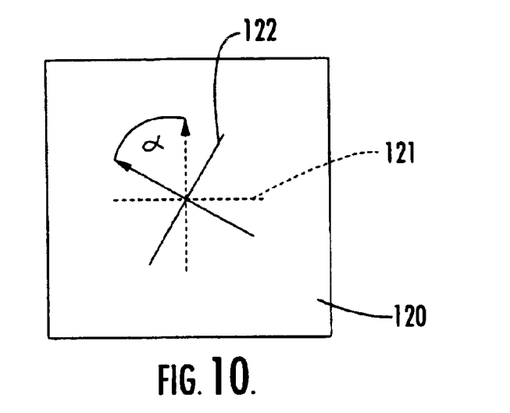
FIG. 10 is a schematic diagram illustrating a two-dimensional pattern of the first reflected beam and the second diverging reflected beam on the detector of FIG. 1 when the second object is displaced at a certain roll angle from the first object.

To determine a roll angle of the second object 31 with respect to the first object 30, the controller 44 preferably defines a first roll angle reference pattern 121, as illustratively shown in FIG. 10. Here, the roll angle reference pattern 121 is a "cross-hair" pattern with an arrowhead defining a zero reference indicator. Again, it will be understood that the roll angle reference pattern 121 may only be numerically defined within the controller 44 (i.e., it will likely not be physically on the array of pixels 120), but it is shown in FIG. 10 to aid in understanding the present example. It should also be noted that only one beam pattern is shown and that the vertical/lateral reference lines have been omitted from FIG. 10 for clarity of illustration of the present example.

Moreover, the target optical element, such as the lens 37, may have a pattern generator associated therewith for imparting a second roll angle reference pattern 122 to one of the first reflected beam 38 and the second diverging reflected beam 39. By way of example, the pattern generator may be a diffractive optical element (DOE) associated with the front surface 40 in the case of the lens 37 when the pattern is to be imparted on the second reflected beam 39. Of course, it will be understood that the DOE could be associated with the rear surface 41 in some embodiments, or with the front or internal mirrored surfaces 48, 49 of the corner cube 47, as noted above. In the illustrated example, the second roll angle reference pattern 122 is the same as the first roll angle reference pattern 121, which allows a roll angle α therebetween to be determined by the controller 44. That is, because the target optical element can be set up or installed so that the zero reference indicator (i.e., arrowhead) of the second roll angle reference pattern 122 corresponds with that of the first roll angle reference pattern 121 when the first and second objects are in a roll alignment, the controller 44 can determine how much the second object 31 has rotated with respect to the first object 30, as will be appreciated by those skilled in the art.

Figure 11:
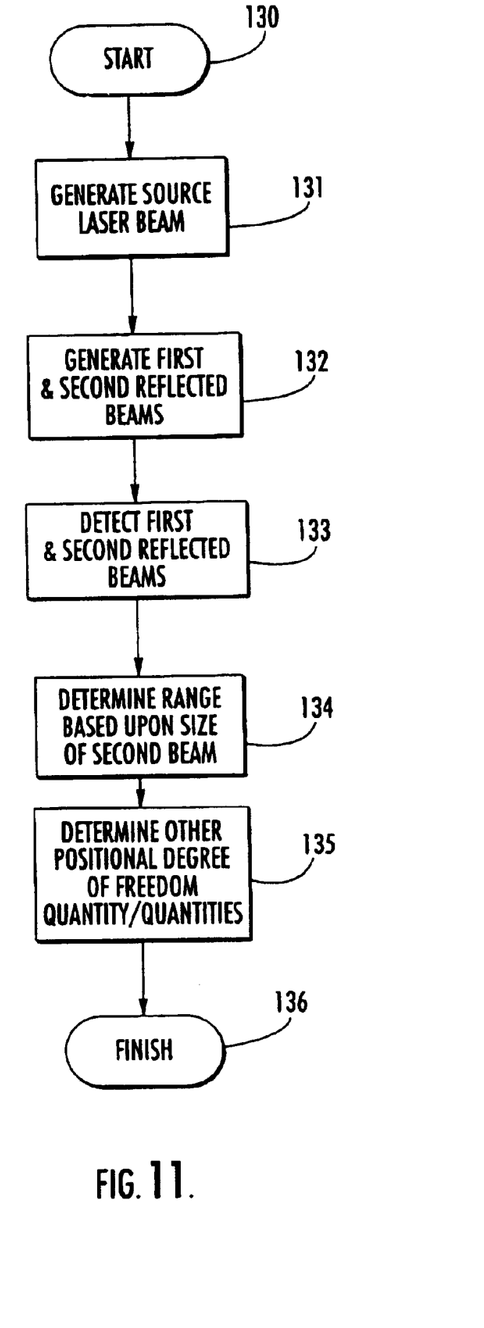
FIG. 11 is a flow diagram illustrating a method aspect of the invention for determining relative positioning between first and second objects.

Turning now additionally to FIG. 11, a method aspect of the invention is now described for determining relative positioning of the first and second objects 30, 31, which again are relatively movable. The method begins (Block 130) with generating the source laser beam 33 toward the second object 31, at Block 131, as previously described above, when the target optical element is in alignment with the source laser beam.

It should be noted that the first and second objects 30, 31 may be in stationary positions during this step, or position measurements may be taken while the first and second objects are moving relative to one another, depending on the given application. By way of example, if a CCD is used for the detector 42, such devices can capture several frames per second. Thus, the positional deviation data may be calculated by comparison of the various data frames, as will be appreciated by those of skill in the art. As such, the present invention provides for essentially "real-time" position determination, if desired.

The method further includes generating the first reflected beam 38 and the second diverging reflected beam 39 from the source laser beam 33 using the target optical element, at Block 132. The first reflected beam 38 and the second diverging reflected beam 39 are then detected using the detector 42, at Block 133. Accordingly, the range between the detector 42 and target optical element is determined based upon the size of the second diverging reflected beam 39, at Block 134, as well as one or more other positional degree of freedom quantities based upon the first reflected beam 38 and the second diverging reflected beam, at Block 135, as previously noted above, thus ending the method (Block 136). Additional method aspects of the invention will be appreciated by those of skill in the art based on the foregoing discussion and will therefore not be discussed further herein.

It will also be appreciated by those of skill in the art that the apparatus and method of the invention therefore provide a relatively inexpensive and simple way to make very accurate positional measurements, such as in all six degrees of freedom. That is, the apparatus 20 can be constructed using commercial parts such as laser diodes, focusing optics, and CCDs. By way of example, vertical, lateral, and range measurements may be made with 100 micron accuracy or better. Moreover, because the size and amount of the components used in accordance with the invention are relatively small, the apparatus and method of the invention are well suited for applications where the first and second objects 30, 31 move fairly close to one another (e.g., within a few inches). Also, the present invention may also be well suited for environments where complicated electronic positioning equipment cannot be used due to interference, etc.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An apparatus for determining relative positioning of first and second objects being relatively movable, the apparatus comprising:
    a laser source carried by the first object for generating a source laser beam toward the second object;
    a target optical element carried by the second object for generating a first reflected beam and a second diverging reflected beam from the source laser beam;
    a detector carried by the first object for detecting the first reflected beam and the second diverging reflected beam; and
    a controller connected to said detector for determining a range between said detector and target optical element based upon a size of the second diverging reflected beam and for determining at least one other positional degree of freedom quantity based upon the first reflected beam and the second diverging reflected beam.

2. The apparatus of claim 1 wherein said controller determines the at least one other positional degree of freedom quantity by calculating a first centroid for the first reflected beam and a second centroid for the second diverging reflected beam, and determining positions of the first and second centroids.

3. The apparatus of claim 1 wherein said controller defines vertical and lateral reference coordinates; and wherein the at least one other positional degree of freedom quantity comprises at least one of vertical displacement, lateral displacement, pitch angle, and yaw angle.

4. The apparatus of claim 1 wherein said controller further defines a first roll angle reference pattern; wherein said target optical element has a pattern generator associated therewith for imparting a second roll angle reference pattern to one of the first reflected beam and second diverging reflected beam; and wherein the at least one other positional degree of freedom quantity comprises a roll angle determined based upon the first and second roll angle reference patterns.

5. The apparatus of claim 4 wherein said pattern generator comprises a diffractive optical element (DOE).

6. The apparatus of claim 1 wherein said controller further determines at least one of alignment error data and second object position data based upon the determined range and the determined at least one other positional degree of freedom quantity.

7. The apparatus of claim 1 wherein said target optical element comprises a lens.

8. The apparatus of claim 7 wherein said lens has a flat rear surface and a convex front surface.

9. The apparatus of claim 8 further comprising a partially reflective coating on the front surface and a more reflective coating on the rear surface.

10. The apparatus of claim 1 wherein said target optical element comprises a corner cube.

11. The apparatus of claim 1 wherein the second diverging beam comprises a plurality of diffracted rays.

12. The apparatus of claim 1 wherein said laser source comprises a laser emitter and a beam splitter downstream therefrom.

13. The apparatus of claim 1 wherein said detector comprises an array of pixel elements.

14. The apparatus of claim 1 further comprising a reference indicator carried by the first object for aligning said laser source.

15. The apparatus of claim 1 wherein said controller controls said laser source to provide a desired signal level at said detector.

16. The apparatus of claim 1 further comprising an optical filter associated with said detector.

17. An apparatus for determining relative positioning of first and second objects being relatively movable, the apparatus comprising:
    a laser emitter and a beam splitter downstream therefrom both carried by the first object and cooperating to generate a source laser beam toward the second object;
    a lens carried by the second object for generating a first reflected beam and a second diverging reflected beam from the source laser beam;
    a detector carried by the first object for detecting the first reflected beam and the second diverging reflected beam; and
    a controller connected to said detector for determining a range between said detector and lens based upon a size of the second diverging reflected beam.

18. The apparatus of claim 17 wherein said controller is also for determining at least one other positional degree of freedom quantity based upon the first reflected beam and the second diverging reflected beam.

19. The apparatus of claim 18 wherein said controller determines the at least one other positional degree of freedom quantity by calculating a first centroid for the first reflected beam and a second centroid for the second diverging reflected beam, and determining positions of the first and second centroids.

20. The apparatus of claim 18 wherein said controller defines vertical and lateral reference coordinates; and wherein the at least one other positional degree of freedom quantity comprises at least one of vertical displacement, lateral displacement, pitch angle, and yaw angle.

21. The apparatus of claim 18 wherein said controller further determines at least one of alignment error data and second object position data based upon the determined range and the determined at least one other positional degree of freedom quantity.

22. The apparatus of claim 18 wherein said controller further defines a first roll angle reference pattern; wherein said lens has a pattern generator associated therewith for imparting a second roll angle reference pattern to one of the first reflected beam and second diverging reflected beam; and wherein the at least one other positional degree of freedom quantity comprises a roll angle determined based upon the first and second roll angle reference patterns.

23. The apparatus of claim 22 wherein said pattern generator comprises a diffractive optical element (DOE).

24. The apparatus of claim 17 wherein said lens has a flat rear surface and a convex front surface.

25. The apparatus of claim 24 further comprising a partially reflective coating on the front surface and a more reflective coating on the rear surface.

26. An apparatus for determining relative positioning of first and second objects being relatively movable, the apparatus comprising:
- a laser source carried by the first object for generating a source laser beam toward the second object;
- a target optical element carried by the second object for generating a first reflected beam and a second diverging reflected beam from the source laser beam;
- a detector carried by the first object for detecting the first reflected beam and the second diverging reflected beam; and
- a controller connected to said detector for determining a range between said detector and target optical element based upon a size of the second diverging reflected beam, said controller further defining a first roll angle reference pattern;
- said target optical element having a hologram associated therewith for imparting a second roll angle reference pattern to one of the first reflected beam and second diverging reflected beam;
- said controller also determining a roll angle based upon the first and second roll angle reference patterns.

27. The apparatus of claim 26 wherein said controller is also for determining at least one other positional degree of freedom quantity based upon the first reflected beam and the second diverging reflected beam.

28. The apparatus of claim 27 wherein said controller determines the at least one other positional degree of freedom quantity by calculating a first centroid for the first reflected beam and a second centroid for the second diverging reflected beam, and determining positions of the first and second centroids.

29. The apparatus of claim 27 wherein said controller defines vertical and lateral reference coordinates; and wherein the at least one other positional degree of freedom quantity comprises at least one of vertical displacement, lateral displacement, pitch angle, and yaw angle.

30. The apparatus of claim 26 wherein said controller further determines at least one of alignment error data and second object position data based upon the determined range and the determined roll angle.

31. The apparatus of claim 26 wherein said target optical element comprises a lens.

32. The apparatus of claim 26 wherein said target optical element comprises a corner cube.

33. A method for determining relative positioning of first and second objects being relatively movable, the method comprising:
- generating a source laser beam toward the second object;
- generating a first reflected beam and a second diverging reflected beam from the source laser beam using a target optical element carried by the second object;
- detecting the first reflected beam and the second diverging reflected beam using a detector carried by the first object;
- determining a range between the detector and target optical element based upon a size of the second diverging reflected beam; and
- determining at least one other positional degree of freedom quantity based upon the first reflected beam and the second diverging reflected beam.

34. The method of claim 33 wherein determining the at least one other positional degree of freedom quantity comprises:
- calculating a first centroid for the first reflected beam and a second centroid for the second diverging reflected beam; and
- determining positions of the first and second centroids.

35. The method of claim 33 wherein the at least one other positional degree of freedom quantity comprises at least one of vertical displacement, lateral displacement, pitch angle, and yaw angle.

36. The method of claim 33 further comprising defining a first roll angle reference pattern; wherein the target optical element has a pattern generator associated therewith for imparting a second roll angle reference pattern to one of the first reflected beam and second diverging reflected beam; and wherein determining the at least one other positional degree of freedom quantity comprises determining a roll angle based upon the first and second roll angle reference patterns.

37. The method of claim 36 wherein the pattern generator comprises a diffractive optical element (DOE).

38. The method of claim 33 further comprising determining at least one of alignment error data and second object position data based upon the determined range and the determined at least one other positional degree of freedom quantity.

39. The method of claim 33 wherein the target optical element comprises a lens.

40. The method of claim 39 wherein the lens has a flat rear surface and a convex front surface.

41. The method of claim 33 wherein the target optical element comprises a corner cube.

* * * * *